(12) United States Patent
Nørgaard

(10) Patent No.: US 8,159,616 B2
(45) Date of Patent: Apr. 17, 2012

(54) HISTOGRAM AND CHROMINANCE PROCESSING

(75) Inventor: Lars Nørgaard, Herning (DE)

(73) Assignee: Bang & Olufsen A/S, Struer (DK)

( * ) Notice: Subject to any disclaimer, the term of this patent is extended or adjusted under 35 U.S.C. 154(b) by 1054 days.

(21) Appl. No.: 12/056,666

(22) Filed: Mar. 27, 2008

(65) Prior Publication Data

US 2009/0244386 A1 Oct. 1, 2009

(51) Int. Cl.
*H04N 5/14* (2006.01)
*H04N 5/21* (2006.01)
*H04N 9/70* (2006.01)
*H04N 9/68* (2006.01)
*H04N 9/66* (2006.01)
*G06K 9/00* (2006.01)

(52) U.S. Cl. ........ 348/672; 348/630; 348/631; 348/638; 348/644; 348/645; 382/168; 382/171

(58) Field of Classification Search .................. 348/592, 348/602–603, 630, 638, 644–645, 662, 672–674, 348/678–679, 682, 712–713; 382/168–172
See application file for complete search history.

(56) References Cited

U.S. PATENT DOCUMENTS

| 7,394,930 | B2 * | 7/2008 | Trimeche et al. ............. 382/167 |
|---|---|---|---|
| 2001/0052945 | A1 * | 12/2001 | Stessen ......................... 348/672 |
| 2002/0118182 | A1 * | 8/2002 | Luther Weindorf .......... 345/204 |
| 2002/0180893 | A1 * | 12/2002 | Nicolas et al. ................ 348/672 |

* cited by examiner

*Primary Examiner* — Kristine Kincaid
*Assistant Examiner* — Gigi L Dubasky
(74) *Attorney, Agent, or Firm* — Stites & Harbison PLLC; Douglas E. Jackson

(57) ABSTRACT

The present invention relates to a method and corresponding system for improving the perceived visual quality of images for instance displayed on a color television screen. According to the invention, there is provided a means for carrying out histogram processing (13) for scaling an input video signal (6) such that the maximum dynamic range is utilised and where the quality of the perceived image is also optimised. According to the invention, the histogram processing (13) provides a transfer function for the image pixels to obtain enhanced image dynamics and also to provide a chrominance gain ($g_c$) for scaling the chrominance components, when the luminance has been changed by the histogram processing. According to the invention, the histogram processing can also take variations of the ambient light into account (5). The method and system according to the invention can be implemented by a histogram processing block (13) providing a luminance transfer function followed by a chrominance processing block (14), where the latter represents a selective chroma adjustment considering each individual pixel of an image.

9 Claims, 7 Drawing Sheets

HISTOGRAM AND CHROMINANCE PROCESSING

TECHNICAL FIELD

The invention relates generally to the field of image processing of colour images and more particularly to histogram and chrominance processing of YUV colour video signals for reproduction on the display screen of for instance a colour TV set.

BACKGROUND OF THE INVENTION

Image processing techniques comprising histogram processing, such as histogram equalisation is known within the art. Histogram processing may serve many different purposes, for instance enhancing the contrast of an image. The theory of histogram equalisation and matching are well known, and for a continuous signal it is theoretically possible to obtain perfect histogram equalisation or a match to a specific distribution. Using the same approach it is possible to obtain an approximate equalisation/match for a discretised histogram. It is furthermore known to apply processing of the chrominance of a video signal in order to attain optimal perceived quality of a colour image for instance on a television screen.

SUMMARY OF THE INVENTION

It is an object of the present invention to provide a method and corresponding system for improving the perceived visual quality of images for instance displayed on a colour television screen. According to a preferred embodiment of the method and system of the invention account is taken both of the video signal itself and of characteristics of the ambient light, for instance sensed by suitable sensor means provided on a TV set.

According to an aspect of the present invention there is provided a histogram processing method and system for scaling an input video signal such that the maximum dynamic range is utilised and where the quality of the perceived image is also optimised.

According to the present invention there is provided a method and corresponding system that carry out histogram processing and chrominance processing, which processings according to a specific embodiment of the invention can be performed sequentially in two consecutive modules. The main functionalities of these processings will be described in detail in the detailed description of the invention. The input is a component signal, i.e. luminance and colour difference signals. This is generally denoted Y'UV, with Y' being the luminance component and U and V the colour difference components.

The main functionality of the histogram processing according to the invention is to provide a transfer function, for the image pixels, to obtain enhanced image dynamics and to provide a scaling factor or chrominance gain for scaling the chrominance components when luminance has been changed by the histogram processing. The said transfer function is also according to a specific embodiment modulated according to a signal provided by an ambient light sensor. If the ambient light intensity is high, the image dynamics are moved towards the low image levels, and vice versa. The black level is set according to a measure of the lowest levels present in the image and a function dependent on the average image level. As mentioned, additionally the histogram processing provides a chrominance scaling value. The chrominance scaling is according to a specific embodiment of the invention based on the ratio of a standard linear transfer function (an identity mapping) T(k) and the transfer function T(k) derived by the histogram processing according to the invention. The scale value is calculated at the average level of the unprocessed image. Thus as the processing is likely to increase/decrease the luminance at the average level, the chroma components are multiplied by the scale value to achieve a similar increase/decrease. This approximately preserves the saturation of the image.

The subsequent chrominance processing represents a selective chroma adjustment. The processing considers each individual pixel (p), having co-ordinates $(U,V)_p$ in the U,V-plane. Based on the pixel co-ordinates, the $(U,V)_p$ components are scaled by a specific gain. The gain will typically be greater than or equal to one, thus maintaining or increasing the saturation of the pixel. Having the gain dependent on the pixel co-ordinates allows selective processing, such that e.g. pixels within a specific region of the (U,V) plane, will be unaltered. This is desirable in e.g. the (U,V) region representing typical skin colour. The magnitude of the scaling will in general depend on the magnitude of the $(U,V)_p$ vector in such a way that small magnitudes will receive a relatively large scaling and vice versa.

BRIEF DESCRIPTION OF THE DRAWINGS

The invention will be better understood by reference to the following detailed description of embodiments of the invention taken in conjunction with the figures, where.

DETAILED DESCRIPTION OF THE INVENTION

Figure 1:
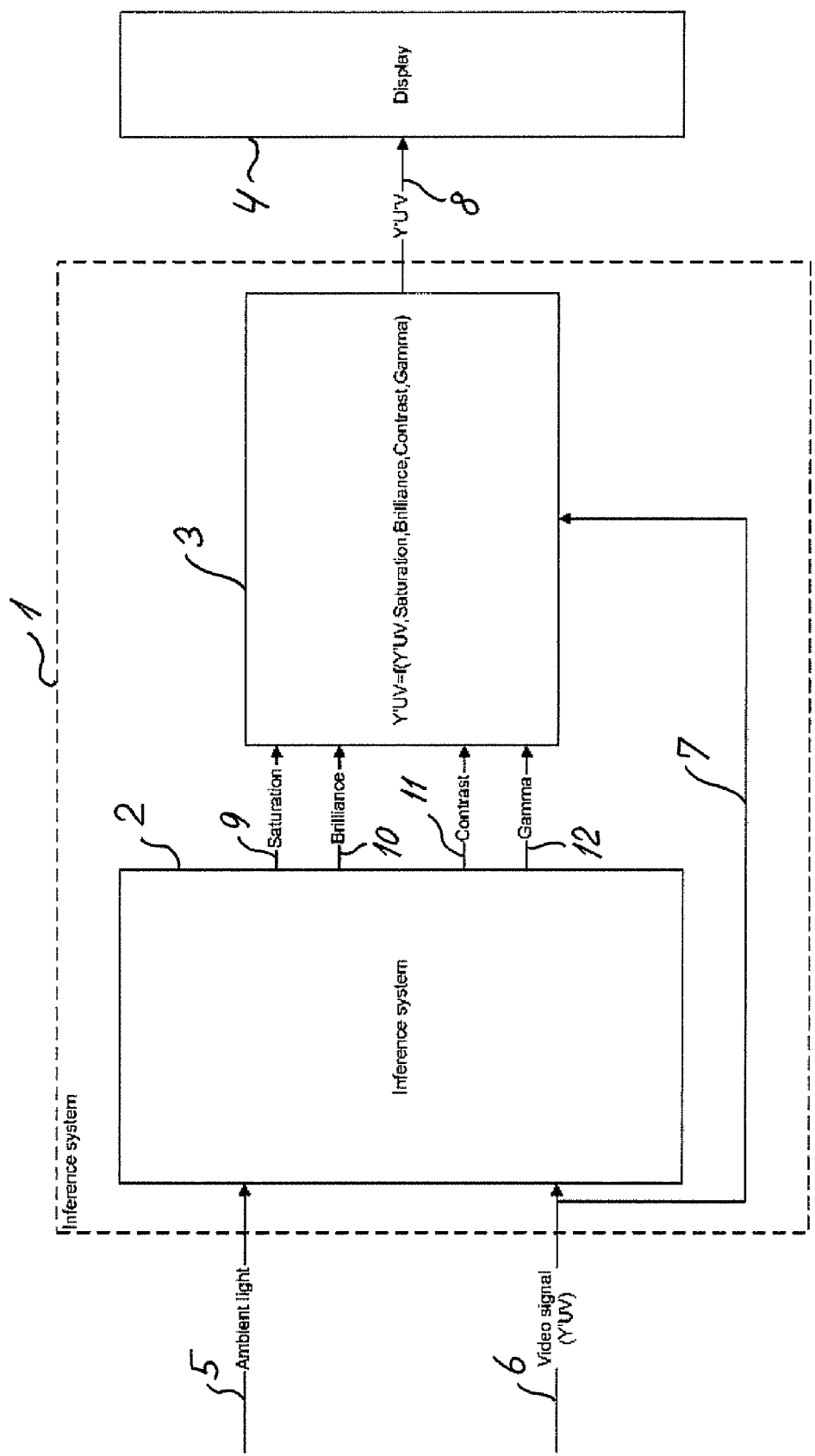
FIG. 1 shows a schematic block diagram illustrating the main functionalities of the method and system of the invention.

Referring to FIG. 1 there is shown a schematic block diagram illustrating the main functionalities of the method and system of the invention. The shown processing system 1 receives an input video signal 6 represented by the components Y'UV according to the known YUV model for representing a colour image, where the Y component represents the luminance (brightness) of the individual pixels p of the image and U and V represent the chrominance (colour) components, mapping each representable colour into a two-dimensional UV-space. The shown embodiment of the system 1 according to the invention comprises an inference system 2 for carrying out the histogram and chrominance processing according to the invention. This system 2 provides output variables 9, 10, 11 and 12 relating to saturation, brilliance, contrast and gamma that by means of the display controlling system 3, which also receives the original Y'UV video signal 6, provide the final output signal 8 to the display means 4. According to a specific embodiment of the invention, the inference system (or specifically the histogram processing means as will be described in detail below) is furthermore provided with an output signal from an ambient light sensor that senses the intensity (or other related quantity) of the ambient light.

Histogram and Chrominance Processing:

Histogram and chrominance processing can be viewed as an inference system, which affects various parameters via modifications of the incoming video signal. The modification is based on the properties of the incoming video signal and (according to a specific embodiment of the invention) an ambient light sensor. The resulting parameters may be based on both global properties (the entire image field) and local properties.

Figure 2:
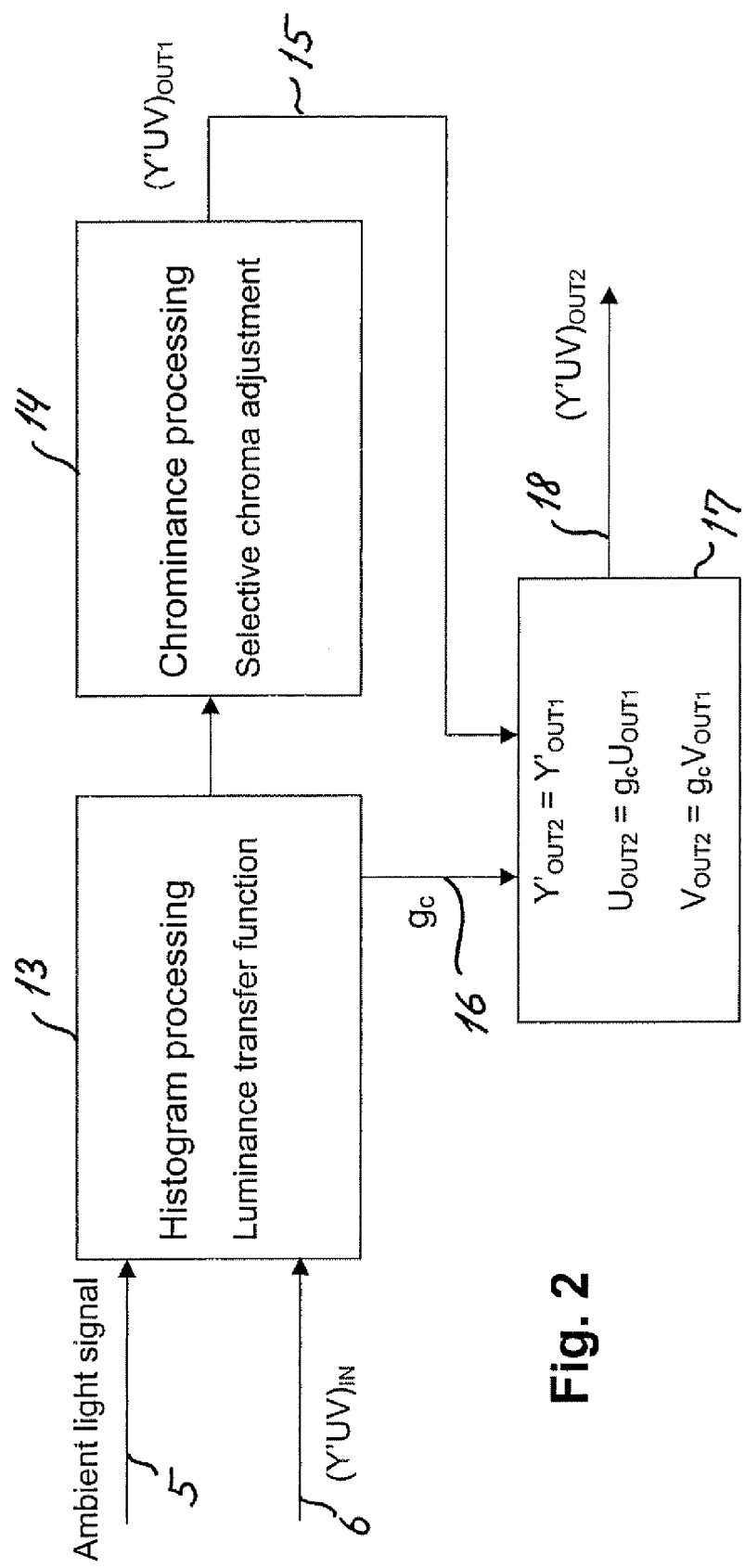
FIG. 2 shows a schematic block diagram illustrating the overall effect of applying the histogram and chrominance processing according to the invention.

With reference to FIG. 2, the inference system 2 consists basically of two consecutive modules 13 and 14, with the main functionalities described below. The input is typically a component signal i.e. luminance and colour difference signals. This is generally denoted Y'UV, with Y' being the luminance component, and U, V the colour difference components. The first module is the histogram processing block 13, by means of which a luminance transfer function T(k) and a chrominance scaling factor or chrominance gain $g_c$ 16 is determined. The second module is the chrominance processing block 14, carrying out selective chroma adjustment (global chroma adjustment is carried out in block 17, cf. below). The original input video signal $(Y'UV)_{IN}$ 6 results by the processing carried out in the modules 13 and 14 in the output signal $(Y'UV)_{OUT1}$ 15 that after scaling of the chrominance components U and V by the chrominance gain $g_c$ as shown in the functional block 17 results in the final output video signal $(Y'UV)_{OUT2}$ 18. In the following a detailed description of the processing actually carried out in the functional blocks 13 and 14 will be given Histogram Processing:

In the histogram processing, the black level is set according to a measure of the lowest level present in the image, and a function dependent on the average image level. The transfer function of the histogram processing block 2 is also modulated according to the input 5 of an ambient light sensor. If the ambient light intensity is high, the image dynamics are increased for the low image levels, and vice versa. In addition, the histogram processing block 2 provides a chrominance scaling value, the chrominance gain $g_c$. The chrominance scaling is based on the ratio of a linear transfer function with offset, and the total transfer function derived by the processing. The global chrominance scale value is calculated at the average level of the unprocessed image, using only the black level offset. Thus, as the processing is likely to increase/decrease the luminance at the average level, the chroma components are multiplied by the scale value to achieve a similar increase/decrease. This approximately preserves the saturation of the image.

With reference to the flow charts shown in FIGS. 3(*a*), (*b*) and (*c*) a more detailed description of the steps carried out in an embodiment of the invention will be given.

Initially a histogram (ref, number 19) of luminance values of the incoming video signal Y'UV (reference number 6 of FIGS. 1 and 2) is formed. This is done by dividing the total range of the luminance signal into N non-overlapping sub-ranges (denoted bins). The bins can have any distribution, and can be of equal size, or the sizes may grow e.g. exponentially. Each sample (or, if the signal is subsampled, less than that) of the signal then adds to the count of the samples in the respective bin. This produces a histogram of luminance sample values, with an appropriate resolution. The histogram of luminance values of the image field is denoted as: $H(k) = n_k$, where k denotes the bin number, and $n_k$ denotes the number of samples in the field falling within the levels represented by bin k. In the following description 'histogram' denotes the normalised histogram (ref. number 20): $p(k) = n_k/n$, where n is the total count of the histogram—i.e. p(k) is the percentage of counts that fall within bin k.

The normalised histogram 20 is used for calculation of the average luminance level (ref. number 21):

$$Y_{AVG} = \sum_{k=0}^{N-1} a(k)p(k)$$

where $a(k)$ is the average level represented by bin k. The calculated average is used subsequently in the algorithm.

The histogram p(k) is according to one specific embodiment of the invention in functional block 22 weighted by a power function $k^\alpha$ such that: $p_1(k) = p(k)k^\alpha$, $k \in \{0, \ldots, N-1\}$, where $\alpha$ is a constant. Subsequently $p_1(k)$ is normalised (ref. number 23) such that $$\sum_{k=0}^{N-1} p_1(k) = 1.$$

It should be noted that weighting of the histogram p(k) by a power function $k^\alpha$ is only one specific example of a weighting function that can be applied in the histogram processing according to the invention. Generally the histogram p(k) can according to the invention be weighted by a weight function w(k) that can exhibit other and possibly more complicated functional relationships with the parameter k (the bin number) than the power function described above.

The power function weighted luminance histogram is then clipped (ref. number 24) by thresholding each bin at a particular maximum level such that: $p_2(k) = \min[p_1(k), c(k)]$, $k \in \{0, \ldots, N-1\}$ where c(k) is a function setting the clipping level for bin k.

After these modifications a cumulative histogram is calculated (ref. number 25):

$$p_3(k) = \sum_{i=o}^{k} p_2(i), k \in \{0, \ldots, N-1\}$$

A second cumulative luminance histogram (ref. number 26) is also formed from the un-modified histogram:

$$p_C(k) = \sum_{i=o}^{k} p(i), k \in \{0, \ldots, N-1\}.$$

The cumulative luminance histogram $p_C(k)$ is used (ref. number 27) for detecting the luminance level, for which the cumulative proportion exceeds a small but fixed percentage of the sample counts. The level found from this, denoted $bl_1$, is used as an offset for the signal, which by subtraction moves the lowest signal level (occurring within some time period) to the lowest valid signal level. Additionally the offset is increased in relation to the average luminance of the image. This additional offset, $bl_2$, is found (ref. number 28) from a scaled power-function relation: $bl_2=c_1Y_{AVG}^\beta$ where $c_1$, $\beta$ are constants. With reference to block 29 the total offset, bl, is the sum of the two offsets $bl_1,bl_2$, thresholded at a maximum offset $b_{max}$ as: $bl=\min[bl_1+bl_2, b_{max}]$ The total offset value bl is temporally filtered (ref. number 30) by a general finite impulse response filter, typically with a low-pass characteristic to avoid large fluctuations.

Figure 3A:
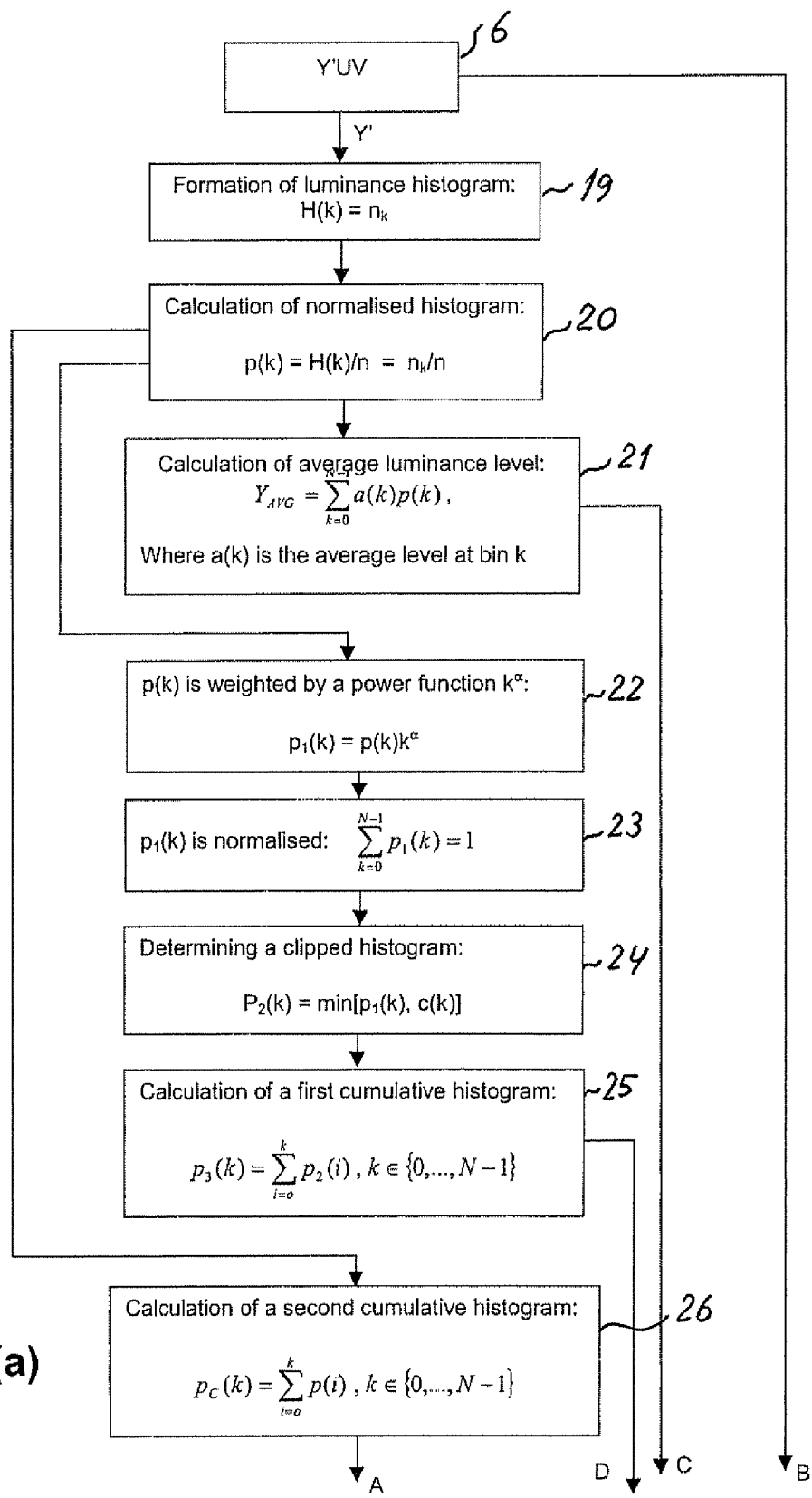
FIGS. 3(a) and (b) show a flow chart summarising the main processing steps for carrying out the histogram processing according to an embodiment of the invention.
Figure 3B:
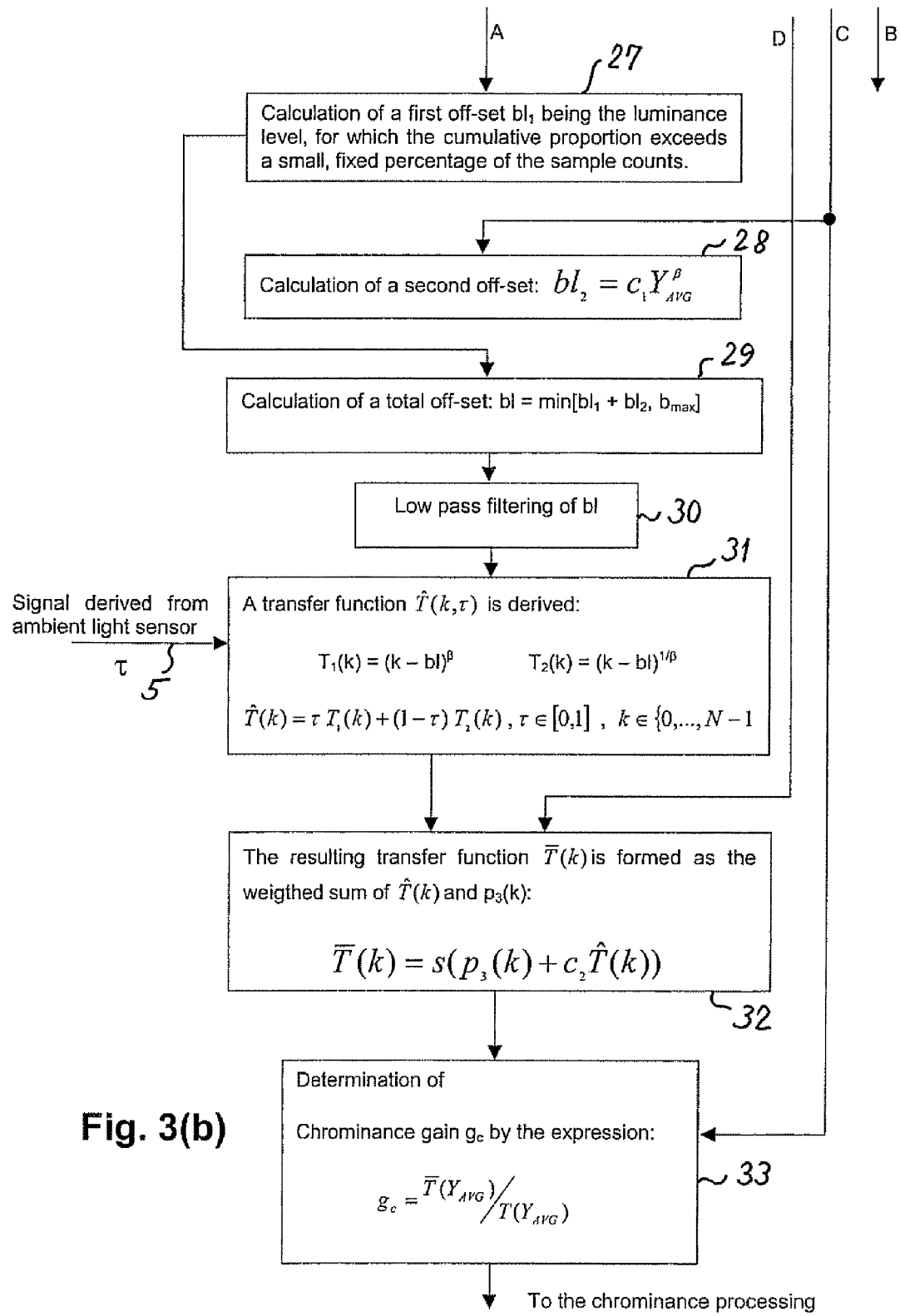
FIG. 3(c) shows a flow chart summarising the main processing steps for carrying out the chrominance processing according to an embodiment of the invention.
Figure 3C:
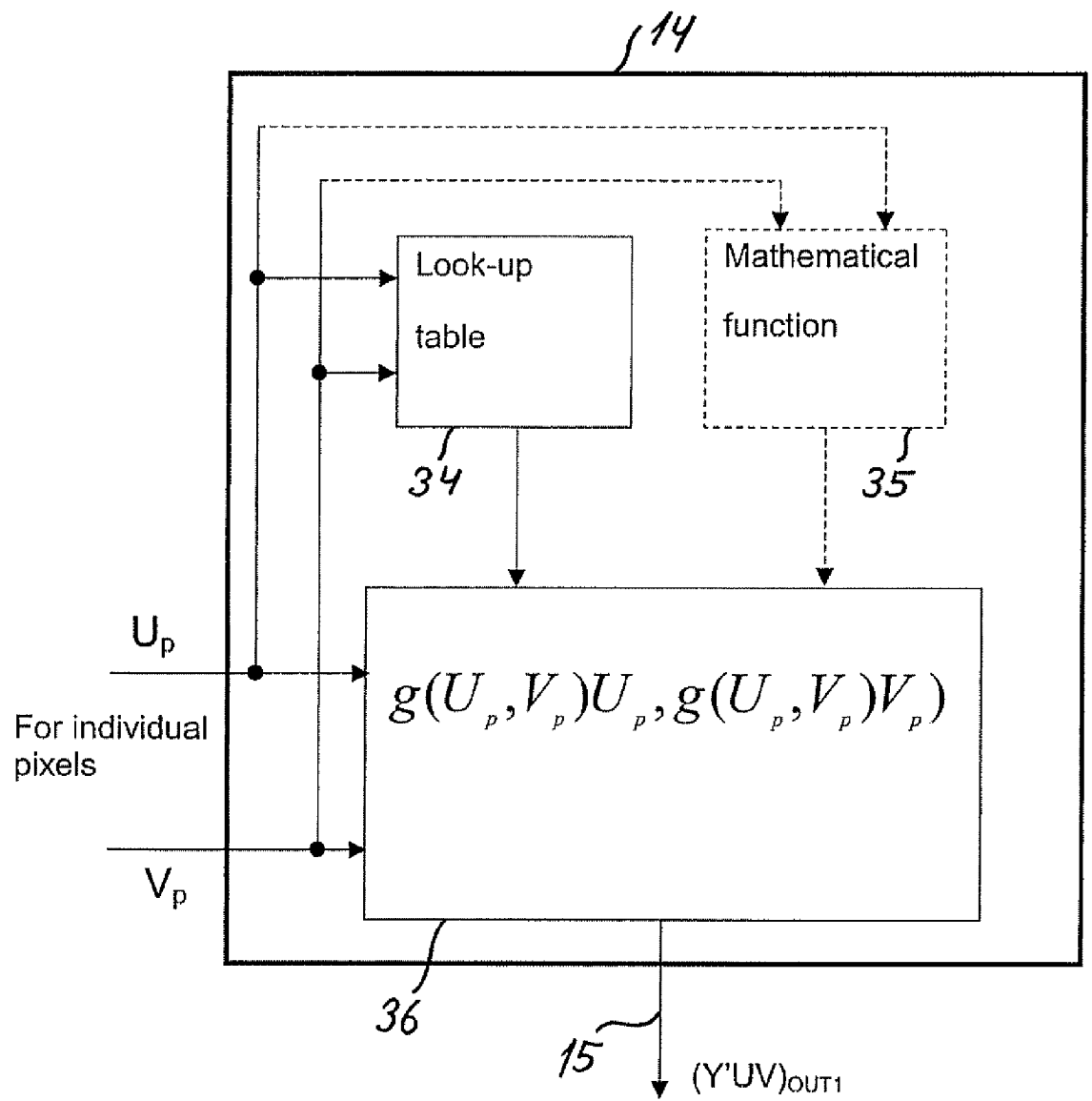

Referring to block 31 of FIG. 3(*b*) an additional step of the algorithm according to this embodiment of the invention partially establishes the transfer function of the histogram processing block 2 based on the ambient light level 5. Taking as reference an identity mapping: T(k)=k, which is transformed by the total offset described above such that the transfer function is: T(k)→T(k)=k−bl, the effect of the ambient light level is to transform this by a power function relation using two functions:

$$T_1(k) = T(k)^\beta = (k-bl)^\beta, T_2(k) = T(k)^{\frac{1}{\beta}} = (k-bl)^{\frac{1}{\beta}}, \beta \in ]0,1[,$$

$$k \in \{0,\ldots,N-1\}$$

which are weighted to produce a transfer function by the relation:

$$\hat{T}(k)=\tau T_1(k)+(1-\tau)T_2(k), \tau\in[0,1], k\in\{0,\ldots,N-1\}$$

The parameter $\tau$ reflects the ambient light intensity, e.g. by having a linear relation with a particular light intensity range. Using a $\beta$ which does not deviate much from 1, the relation for $\hat{T}(k)$ can produce an approximately linear transfer function for some particular $\tau$. If the ambient light intensity is high the $T_1(k)$ function will receive the largest weight, and vice versa. This has the effect of increasing the dynamics for the low signal levels at high ambient light intensity, and vice versa. This results in a mapping, which provides a better utilisation of the available dynamic range, in accordance with human contrast sensitivity.

Referring to block 32 after these transformations a weighted summation of $p_3(k)$ and $\hat{T}(k)$ is formed as: $\overline{T}(k)=s(p_3(k)+c_2\hat{T}(k))$, where s is a scaling parameter, which normalises $\overline{T}(k)$ to utilise the maximum signal output range. The parameter $c_2$ controls the relative weighting of the two transfer functions, and thereby the weighting of histogram equalisation versus ambient light adaptation. The transfer function $\overline{T}(k)$ provides the desired input-output mapping. Thus, $\overline{T}(k)$ represents the transfer function from the input signal Y'UV (reference numeral 6) to the output signal of the histogram processing block 13 in FIG. 2.

Since the luminance mapping is changed by this transfer function, a global chrominance gain, $g_c$ is calculated as: $g_c=\overline{T}(Y_{AVG})/T(Y_{AVG})$ as shown in block 33. Thus, if at the average level, the luminance has increased, the chrominance signals will be multiplied by an equal factor and vice versa. The $g_c$ value is bounded within an interval of unity gain. If it falls outside this interval, it is set at the interval minimum/maximum. The global chrominance scaling effected by $g_c$ is applied after the chrominance processing described below in connection with FIG. 3(*c*).

If the signal range has been quantized to a lower resolution for histogram processing, the resulting transfer function can be scaled to the proper range by using an interpolation method
Chrominance Processing:

The subsequent chrominance processing 14 according to the invention is described below with reference to FIG. 3(*c*). The chrominance processing represents a selective chroma adjustment. The processing considers each individual pixel: $p=(Y_p,U_p,V_p)$. The pixel chrominance co-ordinates: $p_c=(U_p,V_p)$ are used for calculating a local (i.e. individual for each pixel) chrominance gain. The chrominance components can be used as indices for e.g. a table 34 containing the gain values. Alternatively the gain could be calculated from a mathematical function 35. Regardless of method, a function $g(U_p,V_p)$ provides the local gain value for each individual pixel. The chrominance scaled pixel is then given by:

$$p_s=(Y'_p,g(U_p,V_p)U_p,g(U_p,V_p)V_p),$$

forming the output 15 from the chrominance processing block 14.

Referring again to FIG. 2 after application of the global chrominance gain $g_c$, derived by the above luminance histogram processing the output (Y,U,V) co-ordinates of the pixel become:

$$p_S=(Y'_p,g_cg(U_p,V_p)U_p,g_cg(U_p,V_p)V_p).$$

Figure 4:
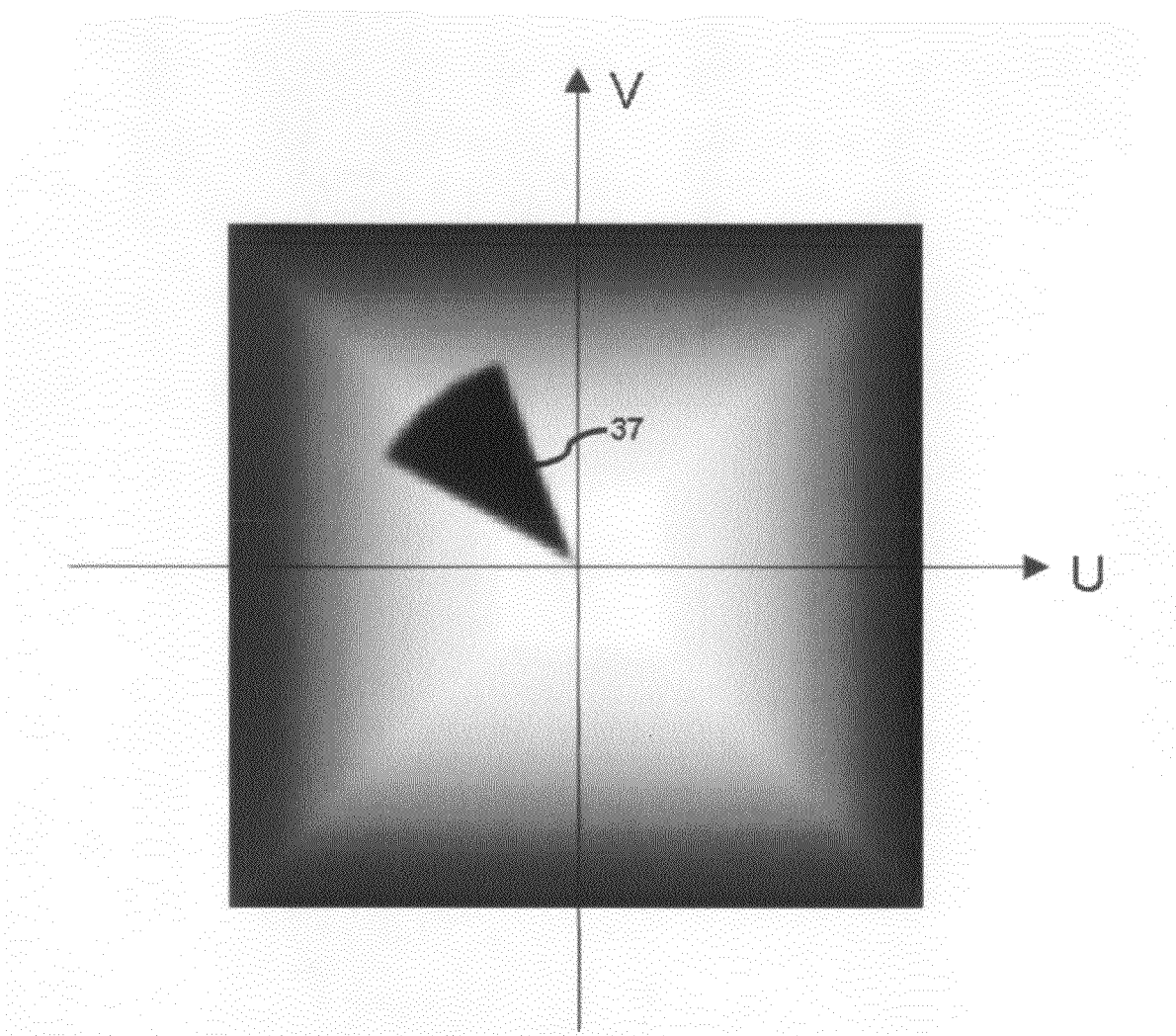
FIG. 4 shows an illustrative graphical representation of a gain function provided by the histogram and chrominance processing according to the invention.

The gain from the chrominance processing, i.e. $g(U_p,V_p)$, will typically be greater than or equal to one, thus maintaining or increasing the saturation of the pixel. An illustrative example of such a gain function, where the gain is represented by the grey tone value, where black indicates unity gain and white indicates a gain value >1, is given in FIG. 4, where (U,V)=(0,0) is located at the centre. For this gain function, most of the (U,V) plane has a homogeneously decreasing gain as a function of (U,V) magnitude. A specific region 37 is set at unity gain, having a smooth transition to the surrounding gain values. In the figure, black indicates unity gain, and white indicates the maximum gain value in the table.

Having the gain dependent on the pixel co-ordinates in this way allows selective processing, such that e.g. pixels within a specific region of the (U,V) plane, will be unaltered. This is desirable in e.g. the (U,V) region representing typical skin colour. The magnitude of the scaling will in general depend on the magnitude of the (U,V) vector, in such a way that small magnitudes will receive a relatively large scaling and vice versa.

Referring again to FIG. 1, the four shown parameters: saturation 9, brilliance 10, contrast 11 and gamma 12 are related to various of the quantities determined as described above and shown in the flowchart in FIG. 3. Thus, saturation 9 is primarily influenced by the chrominance gain $g_c$ which is the direct scaling of the chrominance components $U_p$, $V_p$ resulting from the histogram processing. The chrominance processing furthermore influences the chrominance components $U_p$, $V_p$ of the individual pixels by multiplication by a constant (per pixel) being typically larger than or equal to unity. This furthermore either maintains or increases the saturation 9. Brilliance 10 is primarily influenced by the total off-set bl that improves the black level. Contrast 11 is primarily influenced by the quantity $p_3(k)$ being included in the expression $\overline{T}(k)=s(p_3(k)+c_2\hat{T}(k))$ in that utilisation of $p_3(k)$ alone would have provided approximate histogram equalisation. This would, however, lead to a rather drastic effect on the image, which is according to this embodiment of the invention counteracted by using the two transfer functions in the expression for $\overline{T}(k)$. The parameter gamma 12 is directly influenced by the second term in the above expression, i.e. $c_2\hat{T}(k)$, i.e. the transfer function formed based on the intensity of the surrounding light. The quantities $T_1(k)$ and $T_2(k)$ in $\hat{T}(k)$ can reduce or increase, respectively, the gamma value of the system and the effect hereof is a change of the dynamics of the image.

For the parameter saturation 9 the effect can thus be described for each individual pixel, in that the chrominance signal is changed relative to the luminance signal. For the remaining of the four parameters shown in FIG. 1, i.e. brilliance 10, contrast 11 and gamma 12, it is only relevant to regard the effect for the entire image, as the effect results from the signal values being stretched over the interval of these values in order to attain a new distribution of signal values.

Calculation of the global chrominance gain $g_c$ is in the following illustrated by a specific (and simplified) numerical example of histogram processing according to the invention.

Consider the expression for the transfer function $\overline{T}(k)$:

$$\overline{T}(k)=s(p_3(k)+c_2\hat{T}(k))$$

In the following example, it will be assumed that the number of input levels have been quantizised into ten bins (in an actual implementation this number will typically be larger). It is furthermore assumed that the values of $p_3(k)$ and $\hat{T}(k)$ for each bin number are as given in TABLE 1 below:

TABLE 1

| | k | | | | | | | | | |
|---|---|---|---|---|---|---|---|---|---|---|
| | 0 | 1 | 2 | 3 | 4 | 5 | 6 | 7 | 8 | 9 |
| $p_3(k)$ | 0.0000 | 0.1279 | 0.2768 | 0.3961 | 0.4246 | 0.4901 | 0.6412 | 0.7894 | 0.8556 | 1.0000 |
| $\hat{T}(k)$ | 0.0000 | 0.2148 | 0.3489 | 0.4635 | 0.5669 | 0.6627 | 0.7529 | 0.8387 | 0.9209 | 1.0000 |

If it is furthermore assumed that $c_2=8$ the values for the sum of $p_3(k)$ and $c_2\hat{T}(k)$ given in TABLE 2 below will be obtained:

TABLE 2

| | k | | | | | | | | | |
|---|---|---|---|---|---|---|---|---|---|---|
| | 0 | 1 | 2 | 3 | 4 | 5 | 6 | 7 | 8 | 9 |
| $p_3(k) + c_2\hat{T}(k)$ | 0.0000 | 1.8463 | 3.0684 | 4.1038 | 4.9594 | 5 7916 | 6 6644 | 7 4988 | 8.2225 | 9 0000 |

Assuming furthermore that the final transfer function concerns an 8-bit video signal (256 levels, all levels used as valid signal data), the constant (scale factor) s is used for scaling the output appropriately, in this example yielding: s=255/9. The values of the total transfer function $\overline{T}(k)$ given in TABLE 3 below are then obtained:

TABLE 3

| | k | | | | | | | | | |
|---|---|---|---|---|---|---|---|---|---|---|
| | 0 | 1 | 2 | 3 | 4 | 5 | 6 | 7 | 8 | 9 |
| $\overline{T}(k)$ | 0.00 | 52.31 | 86.94 | 116.27 | 140.52 | 164.10 | 188.83 | 212.47 | 232.97 | 255.00 |

The above data can be used for interpolation by standard methods to the desired number of input-output levels.

Figure 5:
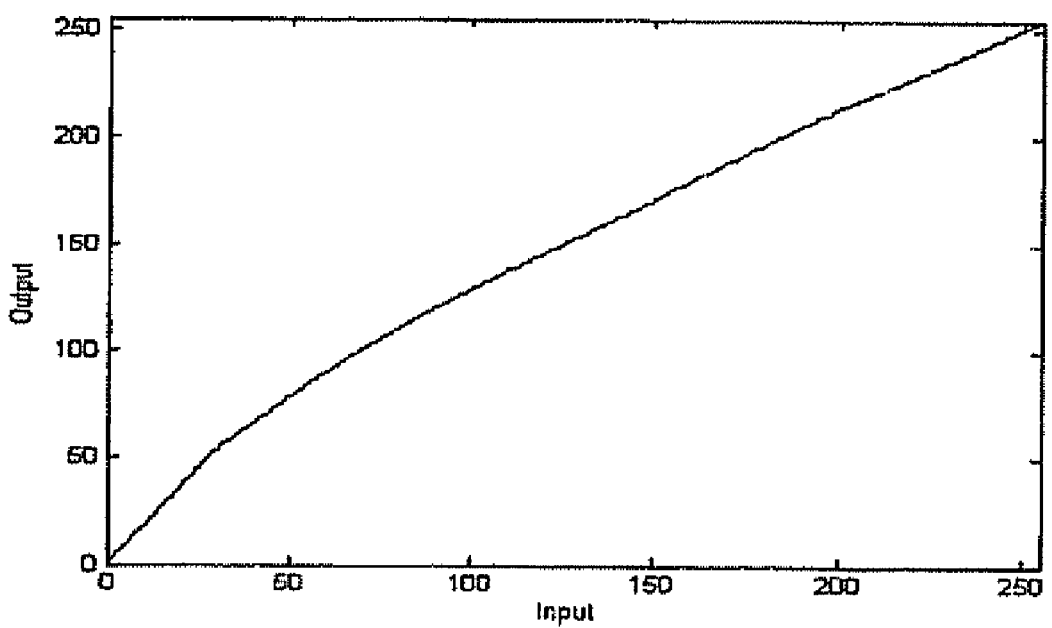
FIG. 5 shows an example of an interpolated mapping for an 8-bit signal input-output function derived by the method of the invention.

For the data shown above, an interpolated mapping for 8-bit signal input-output is given in FIG. 5. This mapping will add dynamics to the low signal levels, at the expense of decreased dynamics for the higher image levels. After interpolation $\overline{T}(k)$ is now defined for the desired input levels. In this example for $k\in\{0, 1, \ldots, 255\}$.

Assuming now that $Y_{AVG}=140$, then $\overline{T}(Y_{AVG})=\overline{T}(140)=162$.

$T(k)$ is in this example an identity mapping minus the offset bl, i.e. $T(k)=k-bl$. Assuming that $bl=1$, $T(140)=139$.

Finally, the chrominance gain $g_c$ can be calculated:

$$g_c = \frac{\overline{T}(Y_{AVG})}{T(Y_{AVG})} = \frac{162}{139} \approx 1.17$$

The average luminance has thus been increased by the histogram processing method according to the invention and the chrominance components should be scaled accordingly by $g_c$.

The invention claimed is:

1. A method for improving the perceived visual quality of images for instance displayed on a colour television screen, the method comprising the steps of:

provision of an input video signal (Y', U, V);

carrying out a histogram processing on said incoming video signal, whereby a luminance transfer function $\overline{T}(k)$ is obtained and based on said luminance transfer function $\overline{T}(k)$ calculating a global chrominance gain $g_c$;

for individual pixels of the image, carrying out a chrominance processing that associates a local gain $g(U_p,V_p)$ for each individual pixel having the colour components $(U_p, V_p)$;

provision of an output video signal (Y', U, V)$_{OUT2}$ for individual pixels wherein:

the luminance component Y'$_{OUT2}$ is determined by said luminance transfer function $\overline{T}(k)$;

the first chrominance component U$_{OUT2}$ is given by the expression:

$$U_{OUT2}=g_c g(U_p, V_p)U_p; \text{ and}$$

the second chrominance component V$_{OUT2}$ is given by the expression:

$$V_{OUT2}=g_c g(U_p, V_p)V_p;$$

whereby the chrominance components of the individual pixels of the image are modified by a global gain factor $g_c$ relating to the characteristics of the entire image and a local gain factor g relating to the individual pixels;

wherein an average luminance level $Y_{AVG}$ over all histogram bins k is determined and wherein said chrominance gain $g_c$ is determined as:

$$g_c=\overline{T}(Y_{AVG})/T(Y_{AVG});$$

where $T(Y_{AVG})$ is an identity mapping minus an offset bl; i.e., $T(Y_{AVG})$ is given by the expression:

$$T(Y_{AVG})=Y_{AVG}-bl;$$

wherein said offset bl is calculated as the sum of two offsets $bl_1$ and $bl_2$, where $bl_1$ is determined from a second cumulative histogram $p_c(k)$ determined by the expression:

$$p_C(k) = \sum_{i=o}^{k} p(i), k \in \{0, \ldots, N-1\}$$

where p(i) is the unprocessed histogram and where said $bl_1$ is then calculated as the luminance level, for which the cumulative proportion exceeds a predetermined, preferably small and fixed, percentage of the sample counts and where $bl_2$ is calculated according to the expression:

$$bl_2 = c_1 Y_{AVG}{}^\beta$$

where $c_1$ and $\beta$ are constants and where said total offset bl is then calculated according to the expression:

$$bl = \min[bl_1 + bl_2, b_{max}]$$

where $b_{max}$ predetermined threshold value.

2. A method according to claim 1, wherein said luminance transfer function $\overline{T}(k)$ is a function of the ambient light intensity or corresponding physical quantity $\tau$.

3. A method according to claim 1,
wherein said luminance transfer function $\overline{T}(k)$ is given by the expression:

$$\overline{T}(k) = s(p_3(k) + c_2 \hat{T}(k))$$

wherein s and $c_2$ are constants;
wherein $p_3(k)$ is a cumulative luminance histogram that is derived from an original, unprocessed luminance histogram p(k) by multiplication hereof with a weight function w(k) that is a function of the bin number k and/or by clipping c(k); and
wherein $\hat{T}(k)$ is a function of the ambient light intensity or other related physical quantity $\tau$.

4. A method according to claim 3, wherein said weight function w(k) is the power function given by:

$$w(k) = k^\alpha.$$

5. A method according to claim 1,
wherein said chrominance processing for individual pixels with chroma components ($U_p$, $V_p$) of an image comprises associating a local gain $g(U_p, V_p)$, such that the individual chroma components $U_p$ and $V_p$ for each given pixel is multiplied by said local gain such that processed output chroma components $(UV)_{OUT1}$ are determined by the expression:

$$U_{OUT1} = g(U_p, V_p) U_p \text{ and } V_{OUT1} = g(U_p, V_p) V_p$$

where said local gain values g are provided by a look-up table using the chroma coordinates (Up, Vp) as index variable in the table.

6. A method according to claim 1,
wherein said chrominance processing for individual pixels with chroma components ($U_p$, $V_p$) of an image comprises associating a local gain $g(U_p, V_p)$, such that the individual chroma components $U_p$ and $V_p$ for each given pixel is multiplied by said local gain such that processed output chroma components $(UV)_{OUT1}$ are determined by the expression:

$$U_{OUT1} = g(U_p, V_p) U_p \text{ and } V_{OUT1} = g(U_p, V_p) V_p$$

where said local gain values g are provided by a mathematical function (35) with the chroma coordinates (Up, Vp) as independent variables.

7. A histogram processing method yielding a luminance transfer function $\overline{T}(k)$ comprising the steps of:
provision of an original, un-processed luminance histogram $H(k) = n_k$, where k is the bin number;
based on said original, un-processed luminance histogram, calculating a normalised histogram $p(k) = H(k)/n = n_k/n$;
weighting said normalised histogram by a suitable weight function w(k) to obtain a weighted histogram $p_1(k) = p(k)w(k)$;
normalising said weighted histogram, such that:

$$\sum_{k=0}^{N-1} p_1(k) = 1$$

determining a clipped histogram $p_2(k) = \min[p1(k), c(k)]$, where c(k) is a function setting the clipping level for bin k;
calculating a first cumulative histogram $p_3(k)$ by the expression:

$$p_3(k) = \sum_{i=o}^{k} p_2(i), k \in \{0, \ldots, N-1\}$$

based on the normalised histogram p(k), determining a second cumulative histogram $p_c(k)$ by the expression:

$$p_C(k) = \sum_{i=o}^{k} p(i), k \in \{0, \ldots, N-1\}$$

from the normalised histogram, determining an average luminance level according to the expression:

$$Y_{AVG} = \sum_{k=0}^{N-1} a(k) p(k)$$

where a(k) is the average luminance level at bin k;
using said second cumulative histogram $p_c(k)$ and said average luminance level $Y_{AVG}$ to determine a total off-set bl according to the procedure:
calculating a first off-set $bl_1$, which the luminance level, for which the cumulative proportion of $p_c(k)$ exceeds a predetermined, preferably small and fixed, percentage of the sample counts;
based on said average luminance level $Y_{AVG}$ determining a second off-set $bl_2$ as $$bl_2 = c_1 Y_{AVG}{}^\beta$$

where $c_1$ and $\beta$ are constants;
calculating said total off-set bl as: $bl = \min[bl_1 + bl_2, b_{max}]$, where $bl_{max}$ is a threshold value;
based on a signal $\tau$ from an ambient light sensor and from said total off-set bl deriving a transfer function $\hat{T}(k)$ according to the following procedure:

$$T_1(k) = (k - bl)^{62} \text{ and } T_2(k) = (k - bl)^{1/\beta} \text{ and}$$

i $\hat{T}(k) = \tau T_1(k) + (1 - \tau) T_2(k), \tau \in [0,1], k \in \{0, \ldots, N-1\}$ based on said first cumulative histogram $p_3(k)$ and said transfer function $\hat{T}(k)$ determining the final luminance transfer function:

$$\overline{T}(k)=s(p_3(k)+c_2\hat{T}(k))$$

where s and $c_2$ are constants.

8. A histogram processing method according to claim 7, where said weight function w(k) is a power function: $w(k)=k^\alpha$.

9. A histogram processing method according to claim 7, wherein a global chrominance gain factor $g_c$ is determined by the expression:

$$g_c=\overline{T}(Y_{AVG})/T(Y_{AVG})$$

where $Y_{AVG}$ is calculated by the expression:

$$Y_{AVG}=\sum_{k=0}^{N-1}a(k)p(k)$$

where a(k) is the average level represented by bin k and where $T(Y_{AVG})$ is an identity mapping minus an offset bl; i.e. $T(Y_{AVG})$ is given by the expression:

$$T(Y_{AVG})=Y_{AVG}-bl.$$

* * * * *